Jan. 8, 1924.
D. C. FISHER
1,480,253
TURNBUCKLE
Filed May 11, 1923
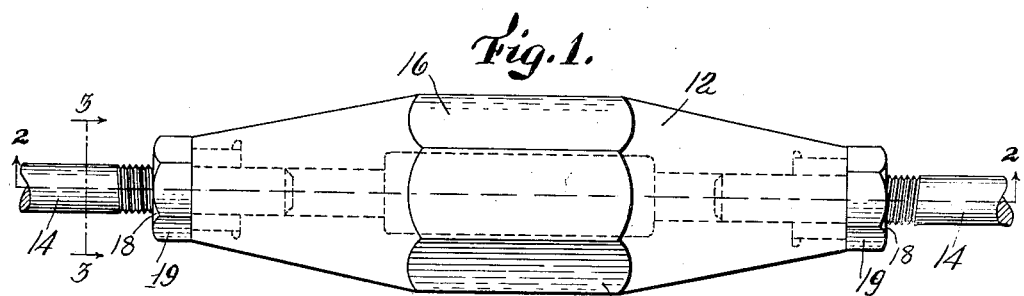
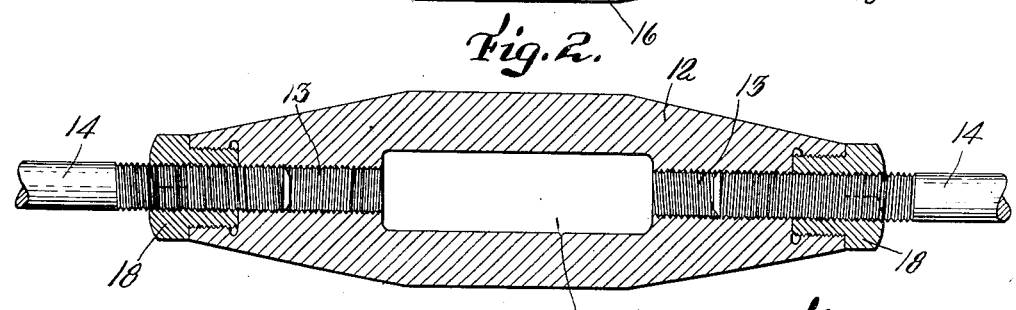
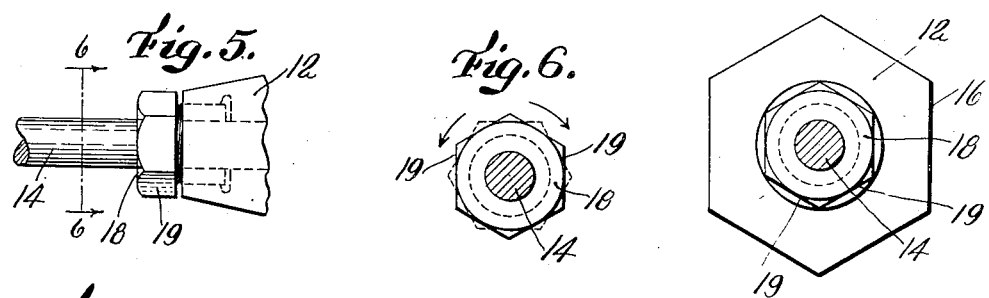
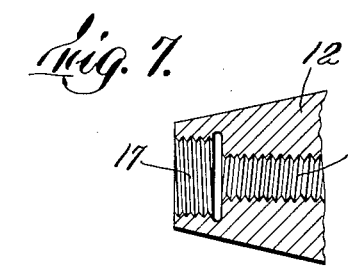
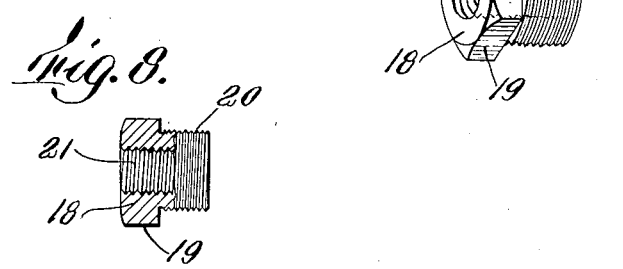
Inventor
Daniel C. Fisher
Attys.

Patented Jan. 8, 1924.

1,480,253

UNITED STATES PATENT OFFICE.

DANIEL C. FISHER, OF BOSTON, MASSACHUSETTS.

TURNBUCKLE.

Application filed May 11, 1923. Serial No. 638,353.

*To all whom it may concern:*

Be it known that I, DANIEL C. FISHER, a citizen of the United States, residing at Boston, in the county of Suffolk and State of Massachusetts, have invented new and useful Improvements in Turnbuckles, of which the following is a specification.

This invention relates to a turn-buckle adapted, as usual, to connect two alined externally threaded rods and to be rotated thereon to simultaneously adjust the rods longitudinally toward or from each other.

The object of the invention is to provide a turn-buckle with means whereby it may be locked upon the connected rods, after the desired adjustment of the rods, to positively maintain such adjustment and prevent accidental variation thereof.

I attain this object by the improved turn-buckle construction hereinafter described and claimed.

Of the accompanying drawings forming a part of this specification—

Figure 1 is a side elevation of a turn-buckle embodying the invention.

Figure 2 is a longitudinal section on line 2—2 of Figure 1.

Figure 3 is a section on line 3—3 of Figure 1, and an elevation of the parts at the right of said line.

Figure 4 is a perspective view of one of the nut members hereinafter described.

Figure 5 is a view similar to a portion of Figure 1, showing one of the nut members in its preliminary adjustment, permitting rotation of the turn-buckle on the rods.

Figure 6 is a section on line 6—6 of Figure 5, and an elevation of the parts at the right of said line.

Figure 7 is a fragmentary sectional view, showing one of the nut members of the turn-buckle.

Figure 8 is a view showing partly in section and partly in side elevation, one of the nut members.

The same reference characters indicate the same parts in all of the figures.

In the drawings, 12 represents the body of a turn-buckle, having the usual internal screw-threaded sockets 13, adapted to engage the two externally threaded rods 14, connected by the turn-buckle, said sockets extending in alinement with each other from opposite ends toward the midlength of the body, their inner ends being spaced apart by an opening or chamber 15 within the body. The inclination of the thread of one socket is opposite that of the thread of the other socket, as usual, the external threads of the rods 14 being correspondingly inclined so that rotation of the body upon said rods in one direction causes a longitudinal adjustment of the rods toward each other, and rotation of the body in the opposite direction causes longitudinal adjustment of the rods away from each other.

The body 12 is adapted, as usual, to be rotated, the body as here shown, having a polygonal wrench-engaging face 16.

In carrying out my invention, I provide means as next described, for locking the body upon the rods 14, after the desired adjustment of the rods has been effected, so that rotation of the body to vary said adjustment is positively prevented.

The end portions of the body 12 are provided with internally threaded socket enlargements 17. As indicated by Figure 7, the inclination of the internal thread of each socket enlargement 17 is opposite that of the thread of the accompanying socket 13. Preferably the internal thread of the enlargement 17 has a finer pitch than the thread of the socket 13.

My improved turn-buckle comprises two nut members 18, each having a polygonal wrench-engaging face 19, an external thread 20 adapted to engage the internal thread of one of the socket enlargements 17, and an internal thread 21, adapted to engage the external thread of one of the rods 14.

The arrangement is such that the nut members are adjustable relative to the body, to first permit the simultaneous rotation of the body and nut members on the rods 14, until the desired endwise adjustment of the rods has been effected, and to secondly lock the body and the nut members against rotation on the rods.

The form and arrangement of the screw threads may be such that when the nut members are adjusted outward from the ends of the body, as shown by Figure 5, the body and nut members are simultaneously rotatable on the rods, and when the nut members are turned in either direction from the position last described, the body and the nut members are locked against rotation on the rods, a small fraction of a complete rotation of the nut members being sufficient to lock and release the turn-buckle.

The arrangement may be such that when the nut members are abutted against the ends of the body 12, as shown by Figures 1 and 2, the turn-buckle is locked upon the rods, and when the nut members are slightly spaced outward from the ends of the body, the turn-buckle is free to rotate on the rods. It is obvious, however, that the nut members may be slightly spaced from the ends of the body when the turn-buckle is locked.

It is obvious that the form of the body may be variously modified and may be of any form providing end portions containing alined internally threaded rod-engaging sockets, an open space between said end portions, and internally threaded socket enlargements in the end portions adapted to engage nut members engaged with the rods connected by the turn-buckle.

The socketed end portions may be connected by spaced apart longitudinal portions or bars providing an open space or slot, into which the inner ends of the rods project, as in many turn-buckles in common use, this form having a minimum weight, and being adapted to be rotated either by a wrench, by hand, or by a rod or lever inserted between said bars.

I claim:

A turn-buckle comprising a body having the usual alined spaced apart internal screw-threaded sockets, adapted to engage externally threaded rods connected by the body, the inclination of the thread of one socket being opposite that of the thread of of the other socket, the end portions of the body being provided with internally threaded socket enlargements; and nut members having wrench-engaging faces, external threads adapted to engage the internal threads of the socket enlargements, and internal threads adapted to engage the external threads of said rods, the arrangement being such that the nut members are adjustable, first, to permit the simultaneous rotation of the body and the nut members on said rods, and the engagement of the rods with the socket threads and with the internal threads of the nut members, and secondly, to lock the body and the nut members against rotation on the rods, the threads of the said socket enlargements and the external threads of said nut members being of finer pitch than the internal threads of the nut members and of the said sockets; the inclination of the threads of the socket enlargements being opposite that of the internal threads of said sockets; and the inclination of the external threads of said nut members corresponding to that of the threads of the socket enlargements.

In testimony whereof I have affixed my signature.

DANIEL C. FISHER.